United States Patent

Nimerick et al.

[11] 4,388,203
[45] Jun. 14, 1983

[54] COMPOSITION AND METHOD FOR MELTING FROZEN AQUEOUS SOLUTIONS

[75] Inventors: Kenneth H. Nimerick, Tulsa; Claude T. Copeland, Broken Arrow, both of Okla.

[73] Assignee: The Dow Chemical Company, Midland, Mich.

[21] Appl. No.: 323,158

[22] Filed: Nov. 20, 1981

[51] Int. Cl.$^3$ .............................................. C09K 3/18
[52] U.S. Cl. ...................................... 252/70; 106/13; 427/212
[58] Field of Search ........................... 252/70; 106/13; 427/212

[56] References Cited

U.S. PATENT DOCUMENTS

| | | | |
|---|---|---|---|
| 2,101,472 | 12/1937 | Kormann | 134/27 |
| 2,116,682 | 5/1938 | Kleinicke et al. | 44/6 |
| 2,222,370 | 11/1940 | Mori | 169/44 |
| 2,373,727 | 4/1945 | West et al. | 106/13 |
| 2,436,146 | 2/1948 | Kleinicke et al. | 252/88 |
| 2,454,886 | 11/1948 | Sapiro | 106/128 |
| 2,716,068 | 8/1955 | Fain et al. | 106/13 |
| 2,731,353 | 1/1956 | Fain et al. | 106/13 |
| 3,298,804 | 1/1967 | Schoch | 44/6 |
| 3,334,696 | 8/1967 | Reynolds | 252/70 |
| 3,350,314 | 10/1967 | Dawtrey et al. | 252/70 |
| 3,624,243 | 11/1971 | Scott, Jr. et al. | 252/70 |
| 3,630,913 | 12/1971 | Scott, Jr. et al. | 252/70 |
| 3,794,472 | 2/1974 | Macaluso et al. | 44/6 |
| 4,117,214 | 9/1978 | Parks et al. | 252/70 |
| 4,163,079 | 7/1979 | Beafore | 428/411 |
| 4,254,166 | 3/1981 | Glanville et al. | 427/212 |

*Primary Examiner*—John E. Kittle
*Assistant Examiner*—Robert A. Wax
*Attorney, Agent, or Firm*—Bruce M. Kanuch

[57] ABSTRACT

Frozen water is thawed by applying to the surface thereof a composition containing water and substantially water soluble components comprising (1) a polyhydroxy compound or monoalkyl ether thereof, (2) an organic nonvolatile compound having at least one hydrophilic group, (2) being different than (1), (3) an inorganic salt which functions to lower the freezing point of water, wherein only one of (2) or (3) need be present but both may be present, (4) sufficient quantity of an organic polymer which functions to increase the viscosity and tackiness of the composition sufficiently to permit a uniform layer of the composition to be placed on the frozen surface and (5) $H_2O$.

10 Claims, No Drawings

COMPOSITION AND METHOD FOR MELTING FROZEN AQUEOUS SOLUTIONS

BACKGROUND OF THE INVENTION

In freezing environments a problem exists in storing and transporting particulate materials, e.g., gravel, coal and the like, in metal containers, e.g., dump trucks, railroad cars and the like. Also, metal parts such as railroad switches and scales tend to freeze up under such conditions. When the moisture on the surface of particulate materials freeze, the ice which is formed acts as a strong adhesive which causes the particulate materials to form a solid and bond to the interior surfaces of such containers and carriers, thus making it difficult to completely clean the surface. Moisture may come in contact with the interior of such containers and carriers through natural sources such as being carried on the particulate materials, melting snow, rain and the like.

It is obvious that particulate materials, such as coal, when frozen into a container can cause serious problems in unloading and the like. Many approaches to solving the problem have been suggested. For example, sodium chloride and calcium chloride have been added to moist coal, as it is being loaded, with some success.

Attempts have been made to coat the inside of the containers and carriers with a hydrocarbon oil, for example, kerosene. This has provided some help in preventing the particulate material from freezing to the interiors. However, it has not met with complete success. Other techniques have been tried for melting the frozen water, also without complete success.

THE PRIOR ART

In U.S. Pat. No. 4,117,214 a method is taught for reducing the strength of frozen water by dissolving in the water prior to freezing a composition containing both a water-soluble polyhydroxy compound or ether thereof, e.g., propylene glycol, and a water-soluble organic nonvolatile compound having a hydrophilic group such as sodium acetate. The compositions can be added to particulate materials such as coal prior to exposure to freezing conditions. In U.S. Pat. No. 4,163,079, a composition similar to that taught in U.S. Pat. No. 4,117,214 is employed to freeze-proof conveyor belts. However, this composition is applied to or dissolved in the aqueous solution before it freezes.

In U.S. Pat. No. 3,298,804 the freezing together of coal particles is prevented by employing a composition of a hydrocarbon and a given class of surface-active compounds.

U.S. Pat. Nos. 2,116,682 and 2,436,146 teach treating coal with a composition containing water, a gel forming colloid and various inorganic salts. A polyhydric alcohol is included to prevent the salt from degrading the colloid.

Mori, U.S. Pat. No. 2,222,370 teaches a dust settling composition for coal mines which is an emulsion which may contain small quantities of ethylene glycol and oleic acid to give the emulsion greater permanence or stability, but no mention is made of cold weather applications.

Macaluso et al., U.S. Pat. No. 3,794,472, treat coal with an emulsion to prevent freezing of the coal.

Other art relating principally to deicing compositions or freeze depressants, particularly those suited for aircraft deicing applications, include Korman, U.S. Pat. No. 2,101,472, which teaches a gel containing gelatine to which is added as an antifreeze substance, glycerol and/or a glycol; West et al., U.S. Pat. No. 2,373,727, which teaches a composition such as in Korman, but also including a hydrocarbon to provide an emulsion, Fain et al., U.S. Pat. No. 2,716,068, which teaches a composition of a glycol, at least one of potassium thiocyanate, potassium acetate, urea, or certain inorganic salts, and optionally sodium nitrite, and Dawtrey et al., U.S. Pat. No. 3,350,314, which teaches a foamable composition of water, an alkylene polyol, and a long chain aliphatic tertiary amine.

Scott, Jr., et al., U.S. Pat. Nos. 3,624,243 and 3,630,913, each relate to chemical deicers containing corrosion inhibitors making them specially suited for use on airport runways.

Finally, Shapiro, U.S. Pat. No. 2,454,886 relates to the prevention of mist and frost on glass and similar sheet material.

SUMMARY OF THE INVENTION

A thawing agent is provided which contains at least one component from each of the following substantially water soluble components (1), (2) and/or (3) comprising (1) a polyhydroxy compound or monoalkyl ether thereof, (2) an organic nonvolatile compound having at least one hydrophilic group, (2) being different from (1), (3) an inorganic salt, which functions to lower the freezing point of water wherein only one of (2) or (3) need be present but both may be present; (4) an organic polymer which functions to increase the viscosity and tackiness of the composition sufficiently to permit the composition to maintain an essentially uniform thickness when applied to a frozen mass; and (5) water as a carrying fluid.

The composition is applied to the surface of a frozen mass of particles, e.g. coal, etc. or other frozen surfaces. Railroad cars loaded with frozen coal or other frozen material; railroad switches, scales and the like can be treated with the composition to thaw the same.

By "water-soluble" is meant sufficiently soluble so that a sufficient quantity of said compound may be dissolved in water to noticeably reduce the tendency of water to freeze.

DETAILED DESCRIPTION OF THE INVENTION

Component (1) is a water-soluble polyhydroxy compound. A preferred group is the polyhydroxyalkanes. Typical members of that class are ethylene glycol, diethylene glycol, triethylene glycol, propylene glycol, dipropylene glycol, glycerine and sugar. Of those materials, ethylene glycol is preferred. The monoalkyl ethers, such as the monobutyl ether of ethylene glycol, are also useful. Mixtures of these materials such as a mixture of alkylene glycols may also be employed. A preferred mixture is ethylene glycol and 1,2-propylene glycol.

Component (2) is a water soluble organic nonvolatile compound which functions to terminate ice crystal growth. The compound must be nonvolatile, i.e., have a sufficiently low vapor pressure at the conditions of use, so that substantially none of the compound will vaporize out of the aqueous solution before the water freezes. This compound should have at least one hydrophilic group such as amine, carboxyl, or carboxylate groups. The compound may be polymeric or nonpolymeric. Typical of the latter are fumaric acid, sodium formate, urea, glycolic acid, tetrasodium salt of ethylenediamine tetraacetic acid, sodium acetate and acetic acid. Other amines and carboxylic materials will be known to the skilled worker. Typical of the polymeric materials are polyacrylamide, polyvinyl pyrrolidone, polyethyleneimine, polyacrylates, polyamide copolymers such as that sold commercially as Arco S-232, and the natural gums, such as guar gum. All of the useful polymers will be of relatively low molecular weight in order to be water soluble. Moreover, they are used in quantities which do not materially affect the viscosity of the solution as do the thickening agents which are more fully defined hereinafter. Preferably an acetate and/or formate is employed.

Component (3) comprises a salt(s), such as an inorganic halide salt, e.g., NaCl, $CaCl_2$, sodium bromide, calcium bromide and the like which functions to lower the freezing point of water. One or more of the salts can be employed.

Component (4) comprises a sufficient quantity of a thickening agent or viscosity builder which functions to increase the viscosity and tackiness of the composition sufficiently to maintain an essentially even coating of the composition when applied to a frozen surface. The thickening agent can comprise any of the polymeric materials hereinbefore described for Component 2 but which have sufficient molecular weight to provide the desired thickening property.

Component (5) is water which functions as a carrying medium.

The amount of each material incorporated in the composition and the ratio of the components may be varied within wide limits.

The composition may contain the following constituents, expressed as percent by weight. More than one of each component in each group of constituents may be employed.

Component

1. Polyhydroxy compound and/or monoalkyl ether thereof, about 5 percent to about 95 percent.
2. Organic nonvolatile compound, 0 to about 25 percent.
3. Inorganic salt, 0 to about 45 percent, wherein at least one of 2 or 3 is present.
4. Thickener, a sufficient amount to increase the viscosity and tackiness of the composition to maintain an essentially even coating of the composition when applied to a frozen surface and permit even penetration upon thawing thereof. Generally, a sufficient quantity is employed to impart a viscosity of about 25 to about 1500 centipoise as measured in a Brookfield LVF viscometer at 60 rpm at 74° F.
5. $H_2O$, about 5 to about 75 percent.

A preferred composition comprises ethylene glycol about 10 to about 32 percent; propylene glycol about 10 to 32 percent; sodium acetate or sodium formate about 0.5 to about 16 percent; calcium chloride or magnesium chloride about 5 to about 35 percent; water about 20 to about 60 percent and a sufficient quantity of a hydroxyethyl cellulose polymer to form a viscous composition having a viscosity of about 25 to about 700 centipoise as measured on a Brookfield LVF viscometer at 60 rpm and 74° F.

Other constituents may be added to the composition to serve functional purposes. Thus, dyes may be added to assist in effective application, bactericides may be added to protect the thickening agent, and stabilizers, antioxidants, corrosion inhibitors and the like may be employed for their functional purposes.

The composition of the present invention can be applied to the surface to be thawed, whether it be a railroad switch, frozen mass of coal in railroad car or truck, conveyor belts, in any convenient manner, such as by spraying, brushing, dipping or the like. The amount applied depends primarily on the thickness of frozen mass or surface to be thawed and on economic factors, too much resulting in a waste of composition. Generally from about 0.003 to about 0.03 gallon per square foot of surface (about 120 cc to about 1250 cc per square meter) is effective for thawing thin coatings of ice. Larger amounts will be required to thaw thick masses of frozen particulate matter.

EXAMPLE

A 2 inch thick layer of $\frac{3}{8}" \times 28$ mesh Thacker seam coal containing 10 percent moisture was lightly compacted in a $2\frac{3}{4}$ inch internal diameter Plexiglas cylinder. The coal was frozen at 2° to 5° F. Various test formulations at temperatures of 74° F. and 5° F. were added to the surface of the frozen coal. The time required for the coal to absorb the fluid was recorded. The treated coal was allowed to soak about 12 hours before defining the depth at which the coal was melted. The amount of certain compositions to melt various sizes of coal was determined in a similar manner using 12 inch long Plexiglas cylinders. In these tests, the coal and compositions were each cooled to 5° F. The composition was added to the surface of the frozen coal. After five minutes soaking, an additional amount of 74° F. coal equivalent to twice the height of the originally treated coal was added. After one days' soaking, the depth of coal that was melted was determined by dismantling the sample. This data was reported in gals/ft$^2$/inch of penetration. The viscosity of each of the compositions was determined on a Brookfield LVF viscometer. The compositions used and the resulting data are set forth below.

Thawing Agent (parts by weight)

A. 14.96 ethylene glycol; 14.96 propylene glycol; 1.87 sodium acetate; 50.51 $H_2O$; 16.4 $CaCl_2$; 0.04 a bactericide identified as BACTERICIDE 40 from NALCO, a minor amount of Alizarine Cyanone Green G Extra dye and 0.2 part of a hydroxyethyl cellulose polymer thickening agent having a molecular weight of 100,000.
B. Same as A except 0.25 part of the hydroxyethyl cellulose was employed.
C. Same as A except 0.3 part of the hydroxyethyl cellulose was employed.
D. Same as A except 0.4 part of the hydroxyethyl cellulose was employed.
E. 14.95 ethylene glycol; 14.95 propylene glycol; 1.87 sodium acetate; 68.62 $H_2O$; a minor amount of Alizarine Cyanone Green G Extra dye and 0.4 of the thickening agent defined in A.
F. 20.19 ethylene glycol; 20.19 propylene glycol; 2.52 sodium acetate; 57.59 $H_2O$; a minor amount of Alizarine Cyanone Green G Extra dye and 0.4 of the polymer described in A.
G. 36.4 of a polyglycerine bottoms from the production of glycerine having the following composition: 80 percent by weight of: glycerine 6–11%, diglycerine 19–24%, triglycerine 8–11%, tetraglycerine 6–8%, pentaglycerine 5–7%, highers balance and 20 percent by weight H₂O; 46.9 H₂O, 16.3 CaCl₂ and 0.2 part of the polymer described in A.

H. The composition of A but instead of the hydroxyethyl cellulose polymer of A, 0.2 part of a polyethylene oxide polymer sold by Union Carbide having the trade name Polyox WSR-301, characterized as water soluble resin having a molecular weight of about 4,000,000, was employed.

I. Same as G except 0.4 part of the polymer.

J. Same as G except 0.6 part of the polymer.

K. 15.07 ethylene glycol; 15.07 propylene glycol; 1.88 sodium acetate; 30.07 H₂O; a minor amount of Alizarine Cyanone Green G Extra dye; 32 CaCl₂ and 0.25 of a thickening agent as defined in A.

L. 22.32 ethylene glycol; 22.32 propylene glycol; 2.78 sodium acetate; 32.0 calcium chloride; 20.33 H₂O; a minor amount of dye and 0.25 of a thickening agent as described in A.

M. 31.21 ethylene glycol; 31.21 propylene glycol; 3.89 sodium acetate; 28.43 H₂O; 5 calcium chloride; a minor amount of Alizarine Cyanone G Extra dye and 0.25 of a thickening agent as defined in A.

N. 16 ethylene glycol; 16 propylene glycol; 16 CaCl₂; 51.75 H₂O and 0.25 of a thickening agent as defined in A.

O. The same as N except magnesium chloride was substituted for CaCl₂.

P. Same as N except sodium chloride was substituted for CaCl₂.

Q. Same as N except sodium acetate was substituted for CaCl₂.

Same as Q except sodium formate was substituted for sodium acetate.

(3) comprising (1) a polyhydroxy compound or monoalkyl ether thereof, (2) an organic nonvolatile compound having at least one hydrophilic group, (2) being different from (1), (3) an organic salt which functions to reduce the freezing point of water, (4) an organic polymer which functions to increase the viscosity and tackiness of the composition, and (5) water.

2. The method of claim 1 wherein the constituents are present in the following amounts as percent by weight:
Component (1) about 5.0 to about 95 percent;
Component (2) 0 to about 25 percent;
Component (3) 0 to about 45 percent wherein at least one of (2) or (3) is present;
Component (4) sufficient quantity to increase the viscosity and tackiness of the composition to form an essentially uniform layer of material when placed on the frozen surface; and
Component (5) about 5 to about 75 percent.

3. The method of claim 1 wherein component (1) is selected from the group consisting of glycols and glycerine, component (2) is selected from the group of acetates and formates, component (3) is at least one inorganic halide salt, and component (4) is selected from the group of cellulose and polyethylene oxide polymers.

4. The method of claim 1 wherein the composition comprises: ethylene glycol about 10 to about 32 percent; propylene glycol about 10 to about 32 percent; sodium acetate or sodium formate about 0.5 to about 16 percent; calcium chloride or magnesium chloride about 5 to about 35.0 percent; water about 20 to about 60 percent and a sufficient quantity of hydroxyethyl cellulose polymer to provide a composition having a viscosity of about 25 to about 700 centipoise as measured on a

TABLE I

PENETRATION AND/OR MELT PROPERTIES OF VARIOUS FREEZE RELEASE FORMULATIONS

| TEST FORMU-LATION | PENETRATION WITH 74° F. FLUIDS | | | PENETRATION WITH 5° F. FLUIDS | | | BROOKFIELD VISCOSITY (cps.) | |
|---|---|---|---|---|---|---|---|---|
| | Δ TIME | INCHES PENETRATION (MELTED) | FROZEN COAL (In.) OBSERVATIONS | Δ TIME | INCHES PENETRATION (MELTED) | FROZEN COAL (In.) OBSERVATIONS | @74° F. | @5° F. |
| A | 22 min. | 1⅜–1½ | ⅜–⅝, very weak | 1 hr. 54 min. | 1½ | ½, very weak | 111.25 | 785 |
| B | 32 min. | 1¼ | ¾, weak | 2 hrs. 20 min. | 1¼ | ⅝, weak | 180.0 | 1400 |
| C | 4 hrs. 16 min. | 1⅜ | ⅝, weak | 7 hrs. 11 min. | 1¼ | ⅝, firm | 293.8 | 1835 |
| D | 22 hrs. 10 min. | 1⅝ | ⅞, very weak | 23 hrs. 27 min. | 1½ | ½, weak | 685.0 | 3930 |
| E | >24 hrs. | 1¼ | ¾, strong | — | — | — | 235.0 | — |
| F | >7 <24 hrs. | 1⅝ | ⅝, very weak | — | — | — | 186.0 | — |
| G | 7 hrs. 23 min. | 1¼–1⅞ | ⅝–¾, weak | — | — | — | 230 | 1580 |
| H | 4 min. | 1⅝ | ¾, weak | — | — | — | 50 | 165 |
| I | 12 min. | 1¼ | ¾, weak | — | — | — | 135 | 645 |
| J | 41 min. | 1–1⅛ | ⅞–1, strong | — | — | — | 334 | 910 |
| K* | >8 hrs. | 1⅜–1¼ | ¾–⅞, weak | — | — | — | 795 | — |
| L* | >8 hrs. | ½ | 1¾–1¾, firm | — | — | — | 2750 | — |
| M | 10 min. | 1¾–2 | 0–¼ weak | — | — | — | 35 | — |
| N | 19 min. | 1½ | ½, weak | — | — | — | 148.75 | — |
| O | 3 hrs. 50 min. | 1¼ | ¾, weak | — | — | — | 183.75 | — |
| P | 7 min. | 1½ | ½, weak | — | — | — | 25.0 | — |
| Q | 14 min. | 1¼ | ¾, weak | — | — | — | 47.5 | — |
| R | 22 min. | 1¼ | ¾, weak | — | — | — | 60.0 | — |

*Precipitated salt.

What is claimed is:

1. A method of thawing frozen water which comprises applying to the surface of frozen water a composition comprising: at least one component from each of the following water soluble components (1), (2) and/or Brookfield LVF viscometer at 60 rpm and 74° F.

5. The method of claim 4 wherein the frozen water is part of a frozen mass of particulate material.

6. The method of claim 5 wherein the particulate material is coal.

7. The method of claim 4 wherein the polymer is a polyethylene oxide polymer.

8. The method of claim 1 wherein the polymer is a polyethylene oxide polymer having a molecular weight of about 4,000,000.

9. The method of claim 1 wherein the frozen water is part of a frozen mass of particulate material.

10. The method of claim 9 wherein the particulate material is coal.

* * * * *